United States Patent [19]

Twisselmann

[11] Patent Number: 5,793,523
[45] Date of Patent: Aug. 11, 1998

[54] BEAM DIVIDER MORE PARTICULARLY FOR OPTICAL INSTRUMENTS SUCH AS OPERATING MICROSCOPES

[75] Inventor: Lorenz Twisselmann, Prisdorf, Germany

[73] Assignee: J.D. Möller Optische Werke GmbH, Wedel, Germany

[21] Appl. No.: 738,181

[22] Filed: Oct. 28, 1996

Related U.S. Application Data

[63] Continuation of Ser. No. 502,530, Jul. 14, 1995, abandoned.
[51] Int. Cl.[6] .................... G02B 21/36; G02B 21/18; G02B 27/14
[52] U.S. Cl. .................... 359/363; 359/373; 359/629
[58] Field of Search .................... 359/363, 368, 359/372, 373, 374, 376, 378, 629, 638; 348/66, 69, 79

[56] References Cited

U.S. PATENT DOCUMENTS 3,704,932  12/1972  Schick ............................. 359/377
4,998,284  3/1991  Bacus et al. ...................... 382/6
5,018,846  5/1991  Gutridge ........................... 359/374

FOREIGN PATENT DOCUMENTS 8902710  5/1989  Germany.
4243452  6/1994  Germany.

*Primary Examiner*—Thong Nguyen
*Assistant Examiner*—Mark A. Robinson
*Attorney, Agent, or Firm*—Friedrich Kueffner

[57] ABSTRACT

In order to better cover the operating field with a stereoscopic operating microscope in connection with a television camera, the operating microscope is provided with a beam divider, whose two beam divider elements (2, 2') inserted into the parallel optical path of the two optical viewing paths (1,1') are disposed in such a way relative to each other that the ray bundles (4,4') deflected by the beam divider elements (2,2') intersect at least once in one plane and are reflected once on reflecting elements (5,5') disposed vertically to this plane, before the ray bundles (4,4') impinge upon image-recording chips (7,7') of camera systems.

3 Claims, 1 Drawing Sheet

BEAM DIVIDER MORE PARTICULARLY FOR OPTICAL INSTRUMENTS SUCH AS OPERATING MICROSCOPES

This is a continuation of application Ser. No. 08/502,530 filed Jul. 14, 1995, now abandoned.

The present invention relates to a beam divider for optical instruments, such as operating microscopes, with a beam divider for television cameras disposed in a housing with two beam divider elements inserted into the parallel optical path of the two viewing optical paths.

BACKGROUND OF THE INVENTION

It is known to divide ray bundles into two or more bundles or, when two or more ray bundles are involved, to combine the same into one bundle. In both cases, beam dividers are employed for this purpose. The separation of a bundle of rays takes place e.g. in binocular viewing systems and in the distribution of a luminous flux to two light receivers. If necessary, from a main optical path, e.g. in microphotography, only a small luminous subflux is branched off for measurement and viewing. The combination of two ray bundles is required in coincidence rangefinders and in photometric tasks.

In the employment of stereoscopic operating microscopes, beam dividers are known which divide the two optical paths in the operating microscope in physical beam division. The optical paths for the operating surgeon pass in this case without deflection, but diminished by the factor of the beam divider ratio, through the beam divider. The rays reflected by the divider layer are conducted out on both sides of the operating microscope by means of mechanical connections of the beam dividers. It is possible to connect to these connections laterally of the operating microscope, cameras or simultaneous viewing means for operation assistants, in which the same image is produced as is seen by the operating surgeon. However, the image is generally no longer stereoscopic.

From the DE-Gbm 89 02 710.8, an intermediate component part of a housing with a beam divider for stereoscopic operating microscopes with an objective, a zoom lens, a zoom lens drive, a lamp, an eyepiece and a suspending means for installation between the zoom lens and the eyepiece is shown. For the right-hand and the left-hand optical path, one glass cube each with a diagonal divider surface area is disposed, which directs the divided optical path laterally from the operating microscope for the production of an image in a miniature camera, a television camera or in a simultaneous viewing means. In this case, in the beam divider housing, next to the lateral outputs for the optical paths on the rearward side facing away from the eyepiece of the operating microscope, further outputs for optical paths are provided.

For the deflection of the optical path into the rearward region of the operating microscope, the beam divider glass cubes are in this case insertable singly or both rotated through 90° about the vertical axis. By virtue of this construction of the intermediate component possible to mount, via the lateral outputs for the optical paths, optical accessories, such as cameras and the like, behind the optical microscope, whose casing, within the region of the outputs for the optical paths, possesses pertinently designed connecting means for the associated equipment. Due to the circumstance that the associated optical equipment is attachable behind the operating microscope, thus on the side which faces away from the operating surgeon, it is intended not to block the access to the operating field.

The present invention is based upon the technical problem of providing a beam divider possessing a simple construction for a stereoscopic operating microscope in order to enable the latter to better cover the operating field and so as to make it possible for the operating microscope to be employed with a television camera without that this would necessitate further intermediate component parts.

SUMMARY OF THE INVENTION

This technical problem is resolved in a beam divider for optical instruments, such as operating microscopes of the type stated in the beginning by the features shown in the claim 1.

According to this, the beam divider is designed in such a way that the ray bundles deflected by the beam divider elements intersect at least once on reflecting elements disposed vertically to this plane before they reach the image-recording chips of television camera systems.

Accordingly, a simple construction does exist inasmuch as, with only a few structural members, the beam divider can be employed in connection with television camera systems in order to thus be able to use operating microscopes in connection with television cameras.

Advantageous constructions of the invention are characterized in the subclaims.

In this case it is particularly advantageous that one optical imaging system each is inserted into the ray bundles from the beam dividers. The image-recording chips are in this case disposed on the beam divider housing rotated about the axes of the ray bundles in such a fashion that the image distortion caused by the rotated beam divider elements is compensated. The image-recording chips in the beam divider housing are provided with adjusting mechanisms constructed in a manner known per se and can consequently be adjusted in three axes arranged vertically relative to each other. It is thereby possible to combine the two images so as to form a stereoscopic pictorial information.

In a non-stereoscopic application of the beam divider, only one side of the beam divider housing is provided with reflecting elements and with television camera image-recording chips.

BRIEF DESCRIPTION OF THE DRAWING

An embodiment example of the invention is explained in greater detail below with the aid of the drawing. Thus FIG. 1, in a top view of the beam divider housing.

DETAILED DESCRIPTION OF THE PREFERRED EMBODIMENT

Figures 1, 2:
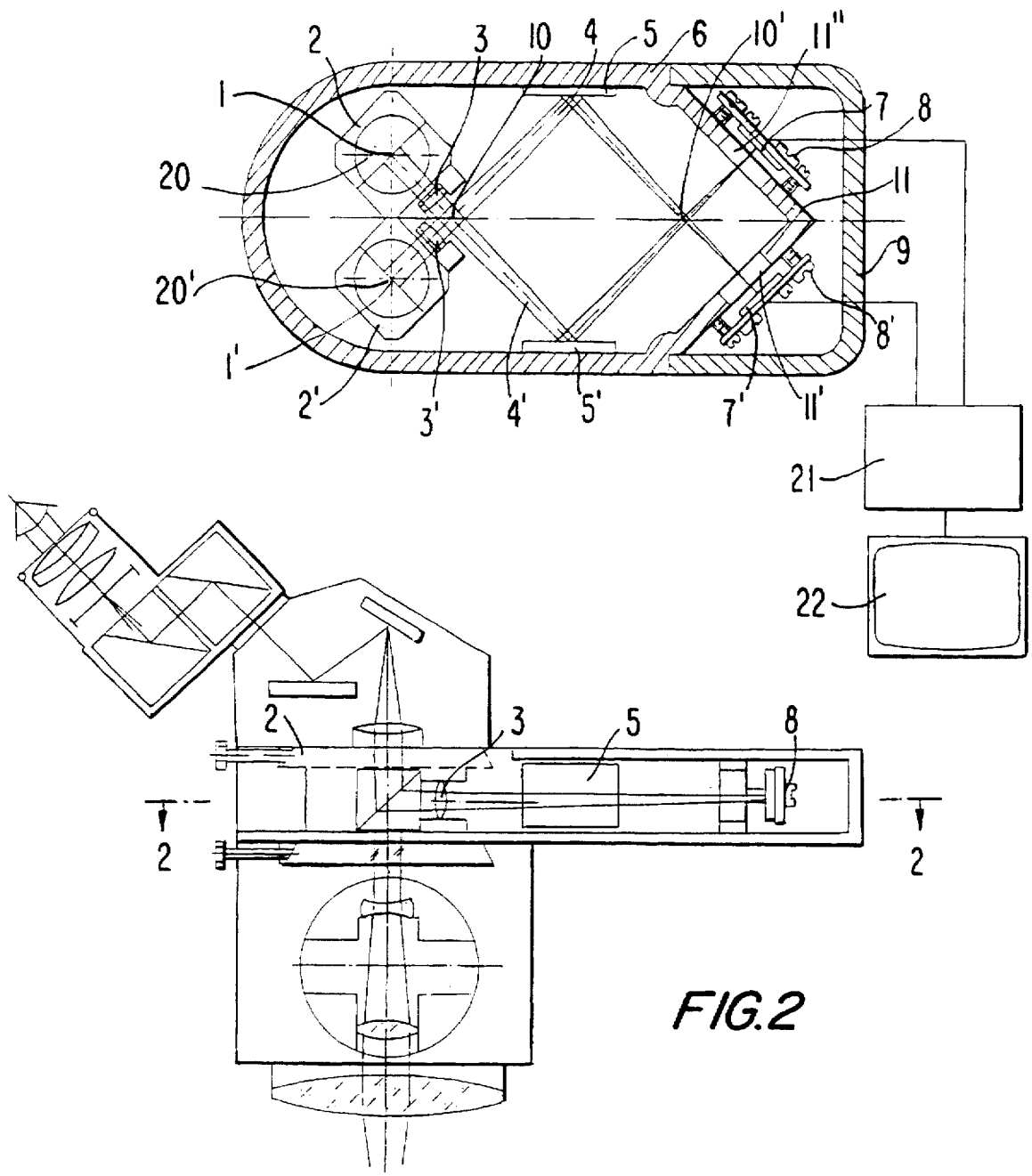
FIG. 2 depicts the beam divider in a side view.

According to FIGS. 1 and 2, two beam divider elements 2, 2' are disposed in a housing made up of the two portions 6,9. The two beam divider elements 2,2' are inserted into the parallel optical paths 20,20' of the two viewing optical paths 1,1'. The ray bundles 4,4' deflected by the beam divider elements 2,2' intersect at 10 in one plane and are deflected once on two elements 5,5' arranged so as to be vertical to this plane on the inner wall areas of the housing before both ray bundles 4,4' intersection at 10' reach two image-recording chips 7,7' of television camera systems 21, 22. The two image-recording chips 7,7' are retained in position on a mounting means 11 disposed in the housing interior, which is provided with perforations 11',11" so as to enable the ray bundles 4,4' reflected by the elements 5,5' to reach onto the image-recording chips 7,7'.

The image-recording chips 7,7' are disposed in the beam divider housing 6,9 with the aid of adjusting mechanisms 8,8' shown in such a way that as to be adjustable in three axes arranged vertically relative to each other so that it is possible for them to be combined into a stereoscopic pictorial information. The adjusting mechanisms 8,8' may, by way of example, be comprised of adjusting screws.

On the beam divider elements 2,2', within the region of the emerging ray bundles 4,4', one optical imaging system 3,3' each is mounted.

The image-recording chips 7,7' are disposed in the housing 6,9 rotated about the axes of the ray bundles 4,4' in such a fashion that the image distortion caused by the rotated beam divider elements 2,2' is compensated. The two beam divider elements 2,2', as is discernible from the FIG. 1, are arranged rotated at an angle to each other in such a manner that their emerging ray bundles 4,4' intersect at 10.

The beam divider elements 2,2', with their objectives 3, 3', the reflecting elements 5,5' and the image-recording chips 7,7' are mounted in the housing 6,9 in such a way that the structure, in relation to an operating microscope not depicted in the drawing and constructed in a manner known per se, essentially projects toward the rear.

The disposition and the construction of the beam divider described here is designed for stereoscopic operating microscopes for television cameras. In a non-stereoscopic application, only one side of the housing 6,9 is fitted with one reflecting element 5 or 5' and one image-recording chip 7 or 7'.

The beam divider constructed according to the invention can be employed with optical instruments and, more particularly, with operating microscopes in connection with television cameras.

What is claimed is:

1. A beam divider for use with a microscope having two parallel optical viewing paths that produce first and second ray bundles, said beam divider comprising:

a housing;

first and second beam divider elements located within said housing and disposed within said two parallel optical viewing paths, and rotated relative to each other about the parallel optical viewing path axes so that the first and second ray bundles are deflected by said first and second beam divider elements along a deflected viewing axis, said deflected viewing axis being substantially perpendicular to said two parallel optical viewing path axes, said first and second ray bundles intersecting at a plane;

first and second opposing reflecting surfaces mounted substantially at right angles to said deflected viewing axis for reflecting said first and second ray bundles after said first and second ray bundles intersect at said plane; and first and second image recording chips for receiving said first and second ray bundles reflected from said first and second opposing reflecting surfaces, so that when said first and second image recording chips are rotated about said deflected viewing axis the rotation of said first and second beam divider elements is compensated.

2. The beam divider as set forth in claim 1, wherein said first and second image recording chips are mounted within said housing and are provided with adjusting means so that said image recording chips are adjustable in three axes disposed vertically to each other so that the two images can be combined into a stereoscopic image.

3. The beam divider as set forth in claim 1, wherein said housing is provided with a rear portion and a front portion and wherein said first and second beam divider elements are arranged in said front portion of said housing.

* * * * *